H. O. PUTT.
AUTOMATIC SPARK CONTROL AND TIMING COUPLING FOR IGNITION MAGNETOS.
APPLICATION FILED MAY 11, 1921.

1,427,847.

Patented Sept. 5, 1922.

Inventor
H. O. Putt
by Lester L. Sargent
Attorney

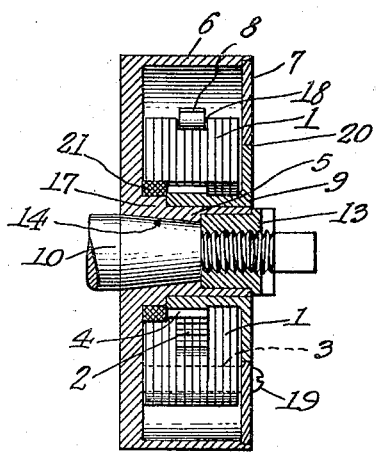
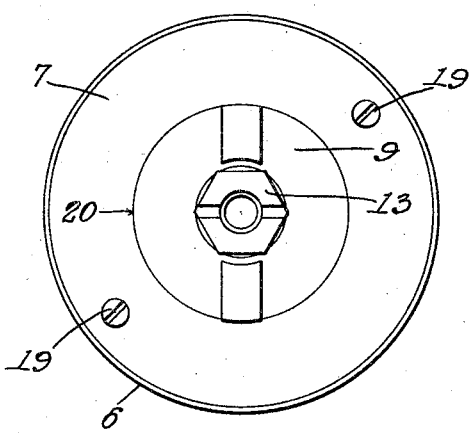
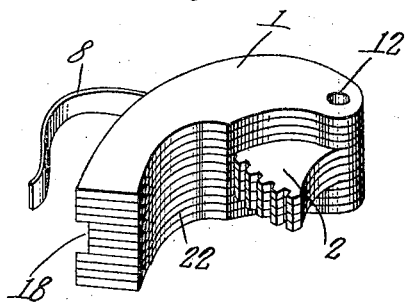
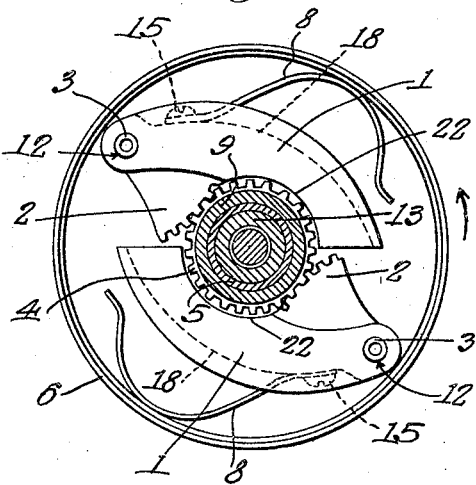

Patented Sept. 5, 1922.

1,427,847

UNITED STATES PATENT OFFICE.

HARLIE O. PUTT, OF ELKHART, INDIANA, ASSIGNOR TO THE ACE MAGNETO COMPANY, A CORPORATION OF INDIANA.

AUTOMATIC SPARK CONTROL AND TIMING COUPLING FOR IGNITION MAGNETOS.

Application filed May 11, 1921. Serial No. 468,516.

*To all whom it may concern:*

Be it known that I, HARLIE O. PUTT, a citizen of the United States, residing at Elkhart, in the county of Elkhart and State of Indiana, have invented a new and useful Automatic Spark Control and Timing Coupling for Ignition Magnetos, of which the following is a specification.

The object of my invention is to provide an efficient, relatively simple, compact and well-balanced mechanism for automatically advancing the ignition spark in relation to the piston position to a degree proportionate to the engine or motor speed, and which will also insure that the spark will be fully retarded when the motor is operating slowly or is being started.

It is further an object of my device to provide a structure that will fit any standard type magneto and which can be easily and instantly changed to operate either in a right hand or clockwise or in a left hand or anti-clockwise direction as regards rotation.

It is further my object to encompass the whole structure in the minimum space limit and at the same time to secure a mechanism with a maximum range of control. It is also an important object of my invention to provide a structure which can be manufactured at low cost.

I attain these and other objects of my invention by the mechanism illustrated in the accompanying drawings in which—

Fig. 3 is a horizontal section on line 3—3 of Fig. 2;

Fig. 4 is a face view with a cover plate in place;

Fig. 5 is a perspective view of one of the weight members and the integral gear sector; and Fig. 6 is a view similar to Fig. 2 of a reverse arrangement of the weights for operating on a motor that turns in a reverse direction.

Like numerals designate like parts in each of the several views.

Figure 2:
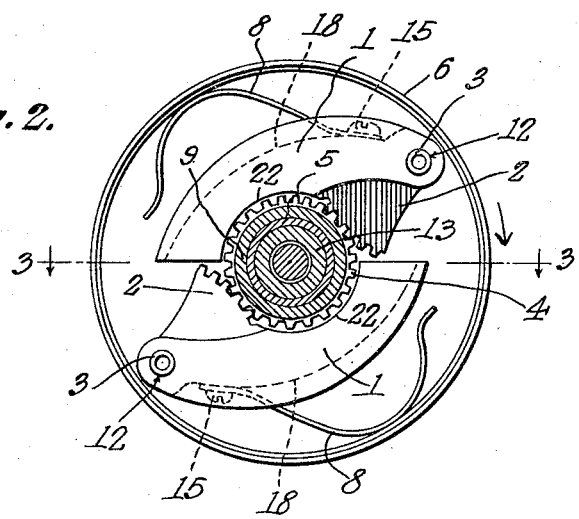
Fig. 2 is a vertical section on line 2—2 of Fig. 1.

Referring to the accompanying drawings, I provide oppositely positioned weights 1 each having an orifice 12 at one end by means of which the weights are pivotally mounted on the posts or studs 3 of the casing 6. The weights are constructed of a plurality of flat plates or punchings riveted together, so as to secure absolute uniformity in weight and dimension. The centrally located punchings are formed with a laterally projecting gear sector 2 which meshes with a centrally located pinion gear 4. Gear 4 is securely and rigidly affixed to the driving member 9. A slot or groove 18 is formed in the back or outer curvature of the assembled weights 1, as illustrated in Fig. 2. I provide suitable flat steel springs 8 affixed to the weights at one end of each weight by means of screws 15, the spring for each weight being positioned within the slot or groove 18 in the outer curvature of the weight, and having an outwardly arched portion of the spring bearing against the interior wall of the casing. The housing or casing 6 is provided with a central hub 5 which in turn is provided with a taper bore 14 so that the hub will fit a standard tapered magneto shaft, 10. Hub 5 is also provided with a key seat 16 to receive the customary Woodruff key 11 whereby to secure the shaft 10 on hub 5. The front end of this hub is counterbored to receive the nut 13. The enlarged portion 17 of the hub 5 is slightly larger in diameter than the pinion gear 4 and acts as a stop for the curved portions 20 of weights 1 in their full retard position and prevents their contact with pinion gear 4 at any time. The front or forward external surface of the hub is machined to receive the driving member or coupling 9, which is rotatably fitted thereon and abuts against the shoulder of head 17. The nut 13 is small enough to permit the removal or insertion of the driving member or coupling 9 for the purpose of effecting the timing adjustment hereinafter described.

The weight studs 3, which are riveted into the housing securely, are drilled and tapered at their free ends to receive two screws 19 which hold the cover plate 7 in position. This cover plate has a central opening 20 affording clearance for the driving member 9.

Figure 1:
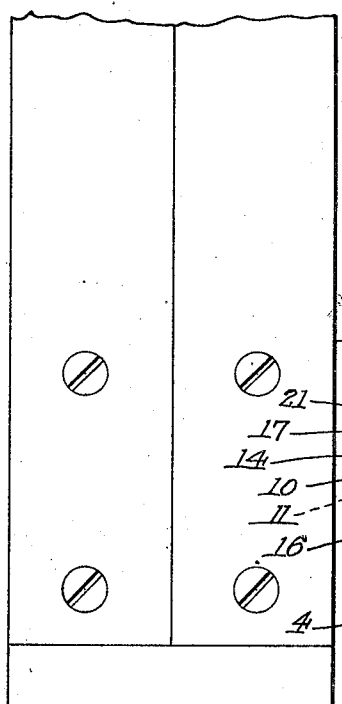
Figure 1 is a vertical section of my invention.

For the purpose of eliminating rattling or noise when the weights are suddenly forced in against the flange or hub of the housing I provide a hard felt washer 21. When the structure shown in Figs. 1 and 2 is rotated in a left hand direction the driving torque and spring tension forces the weights toward the center. As the speed of rotation increases, centrifugal force overcomes the torque and tension, and causes the free ends of the weights to expand or move outwardly. This operation in turn causes the housing to advance in relation to the driving coupling; and the housing being keyed to the armature shaft advances the armature which, through the earlier functioning of the magneto interrupter causes an earlier or advanced spark, in a manner well known to those skilled in the art. In other words, the magneto is operated as a fixed spark magneto but my spark controlling device effects a difference automatically in timing between the magneto on which it is mounted and the motor to which it is connected.

The centrifugal effect on the weights increases with their distance from center and the speed of rotation. To obtain a gradual and uniform degree of advance and prevent the weights from throwing out entirely at the instant the centrifugal forces balance the driving torque, I employ the springs 8 of suitable tension formed as shown in Fig. 2. The normal tension is very light but as the weight moves outwardly the free end of each spring moves inwardly or forwardly and engages said weights near their free extremities, the operation tending to flatten out the springs from the external curvature of the weights as they expand or swing outwardly. Thus a uniformly proportionate tension is obtained in relation to the increase of centrifugal force, and consequently a uniform or gradual advance of the ignition is obtained, distributed throughout the range of the structure, which is approximately 40 degrees.

The difference in gear ratios between the pinion gear 4 and the gear sectors 2 is 1½ to 1, approximately, which provides the maximum degree of advance obtainable within the practical space limits available.

The gear sectors 2 are centrally located in relation to each other and the weight assembly, which permits the weights to be assembled in the housing as in Fig. 2 for a right hand or clockwise rotation, or as in Fig. 6 for a left hand or anti-clockwise rotation. No changes of any kind in the structure are necessary to assemble the device for a reverse rotation.

The cover 7 may be removed for inspection without removing the magneto M or driving coupling 9, and yet it is practically dustproof.

The tension of the springs 8 may be adjusted to permit a full advanced position at any predetermined motor speed and the weights are heavy enough to start to advance at a motor speed of 250 to 350 revolutions per minute, which is considered good practice.

By removing driving member 9 and turning it one or more teeth backward or forward, the timing adjustment of the magneto to the motor is effected in a manner which is well known to those skilled in the art.

The longitudinal dimension is practically the same as that of a standard magneto coupling, hence the instrument requires no additional space for installation. Thus when washer 21 is embraced by the inner curvature 22 of the weight 1 the weights are turned or forced toward the center at low engine speeds, thus affording a cushion or anti-rattling effect when the weights neutralize torque and tension and start to move outward. The rattling is caused by variation in torque due to the intermediate play of the armature of the magneto on which the control is installed, and the addition of this washer 21 prevents rattle or noise that would otherwise occur when the weights are permitted to strike the metal flange or enlarge portion 17 of hub 5.

The driving torque applied at the coupling is transmitted through the gear and sectors to the housing and magneto shaft. The driving torque tends to force the weights inwardly or toward center, as shown in Figs. 2 and 6.

What I claim is—

1. In an automatic spark control and timing coupling for magnetos, the combination of a casing having a hub suitably bored to be mounted on and affixed to the shaft of a magneto, oppositely positioned studs on the interior of the casing, oppositely arranged weights pivotally mounted on the aforesaid studs, each of said weights having an interiorly projecting gear segment, a pinion gear adjustably mounted on the hub and with which the aforesaid gear segments mesh, coupling elements integrally connected with said gear, said coupling elements being connectible with a coupling member on the engine shaft, a plate removably attached to the studs on which the weight members are pivotally mounted, said plate having a central opening for the magneto shaft, for the purposes described.

2. In an automatic spark control and timing coupling for magnetos, the combination of a casing adapted to be secured to the shaft of a magneto, weight members mounted on opposite sides of the interior of the casing, said weight members including gear elements, a rotatable pinion gear with which the gear elements mesh, means for preventing contact of the said elements with the pinion gear except as to the gear portions thereof, spring means on the rear of the weight elements pressing against the interior wall of the casing and arranged to exert tension first on the shank or pivoted end and subsequently on the free end of each of the weight elements to prevent the outer swinging movement of the weight elements under the stress of centrifugal action, and the pinion gear having a coupling element formed integrally therewith for driving same, and a cover plate surrounding said coupling element and encircling the aforesaid weight members gears and springs.

3. In an automatic spark control and timing coupling for magnetos, the combination of a casing having a hub suitably bored to be mounted on a magneto shaft, means securing said member on the magneto shaft, opposite weight elements pivotally mounted on the interior of the casing, a pinion gear loosely mounted on the hub of the casing, said pinion gear having projecting coupling element formed integral therewith, springs on the outer surface of the weight elements and bearing against the inner wall of the casing, a nut engageable on the end of the magneto shaft and bearing against the hub of the casing to secure the casing in place, opposite weight elements, said weight elements consisting of a series of punchings riveted together to insure uniformity of weight and dimensions, said weight elements having an inwardly extending gear sector, and having inwardly curved portions adjacent said gear sectors, the hub shaft having an enlarged portion, a suitable washer on said portion, and against which the above mentioned inwardly curved portion of the punchings bear, leaf springs mounted in grooves in the outer walls of the weight members said leaf springs being of broad U-shape and having their free ends in proximity to but spaced from the free ends of the weight elements and bearing against the interior wall of the casing to counteract the effect of centrifugal force on the weight members and a cover member encircling the coupling element and protecting the mechanism from dust and grease.

4. In an automatic spark control and timing coupling for magnetos, the combination of a casing bored for mounting on the shaft of a magneto to which it is to be affixed, oppositely positioned weight elements having one end of each element pivoted on said casing to permit free swinging movement of the weight elements, a gear segment on each of the weight elements, a removably and adjustably mounted pinion gear with which said weight elements mesh and a coupling member integral with the pinion gear, whereby the timing of the device may be readily and accurately made by adjusting the position of the pinion gear and the integral coupling member.

5. In an automatic spark control and timing coupling for magnetos, the combination of a casing bored for mounting on the shaft of a magneto to which it is to be affixed, oppositely positioned weight elements having one end of each element pivoted on said casing to permit free swinging movement of the weight elements, a gear segment on each of the weight elements, a pinion gear with which said weight elements mesh, a coupling member integral with the pinion gear, broadly U-shaped leaf springs affixed to the outer portions of the weight elements the free ends of said springs being positioned in proximity to the free ends of the weight elements.

6. In an automatic spark control and timing coupling for magnetos, the combination of a casing bored for mounting on the shaft of a magneto to which it is to be affixed, oppositely positioned weight elements having one end of each element pivoted on said casing to permit free swinging movement of the weight elements, a gear segment on each of the weight elements, a pinion gear with which the gear sectors of said weight elements mesh, a coupling member integral with the pinion gear, leaf springs affixed to the outer portions of the weight elements the free ends of said springs being positioned in proximity to the free ends of the weight elements to exert the necessary tension to resist gradually increasing centrifugal force exerted by the weight members, the hub of the casing having an enlarged portion, a washer on said portion, the weight elements having curved inner surfaces bearing against said enlarged portion and holding said weight elements out of contact with the pinion gear, said weight elements being reversibly mounted on the casing.

7. In an apparatus of the class described, the combination of a cup shaped casing suitably shaped for mounting on the hub of a magneto shaft, oppositely positioned studs in said casing, weight elements freely pivoted on said studs, and adapted for removal and for reverse positioning in said casing, gear sectors integral with each of said weight elements, springs on the weight elements bearing against the outer wall of the casing arranged to exert tension first on the shank or pivoted end and subsequently on the free end of each of the weight elements, a gear meshing with the gear sectors, a coupling member integral with said gear element, means for securing the coupling element, a gear on the casing and a cover plate encircling the coupling element completely encasing and protecting the apparatus from dust, said covering being releasably secured to the studs on which the weight elements are mounted.

8. In an automatic spark control and timing coupling for magnetos, a casing mounted on the magneto shaft, opposite weight elements pivoted on said casing, a coupling element, means operatively engaging the coupling elements, weight elements, springs on the outer walls of the weight elements arranged to exert tension first on the shank or pivoted end and subsequently on the free end of each of the weight elements to restrain their outward swinging movement under the stress of centrifugal force, and means for securing said members in operative relation, substantially as set forth.

HARLIE O. PUTT.